Aug. 29, 1933.  C. MAIER  1,924,506
SAFETY MECHANISM FOR ELEVATORS
Filed March 28, 1933  3 Sheets-Sheet 1

Inventor
Charles Maier
By Clarence A. O'Brien
Attorney

Aug. 29, 1933.   C. MAIER   1,924,506
SAFETY MECHANISM FOR ELEVATORS
Filed March 28, 1933   3 Sheets-Sheet 2
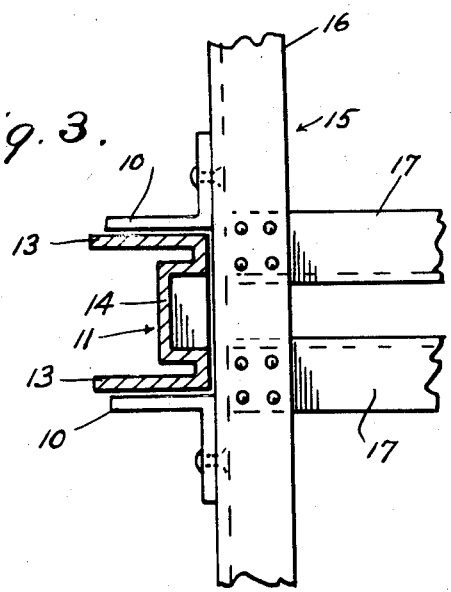
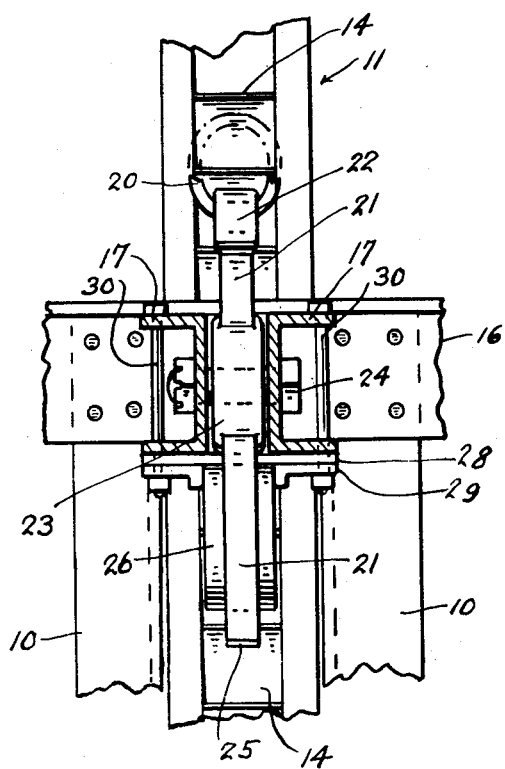
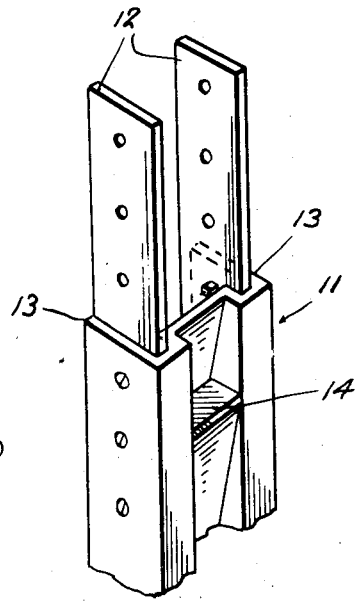
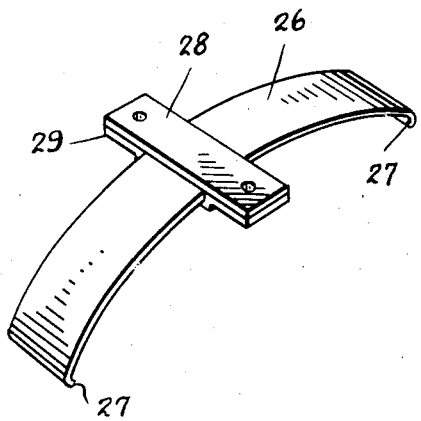
Inventor
Charles Maier
By *Clarence A O'Brien*
Attorney Aug. 29, 1933.　　　　C. MAIER　　　　1,924,506
SAFETY MECHANISM FOR ELEVATORS
Filed March 28, 1933　　　3 Sheets-Sheet 3
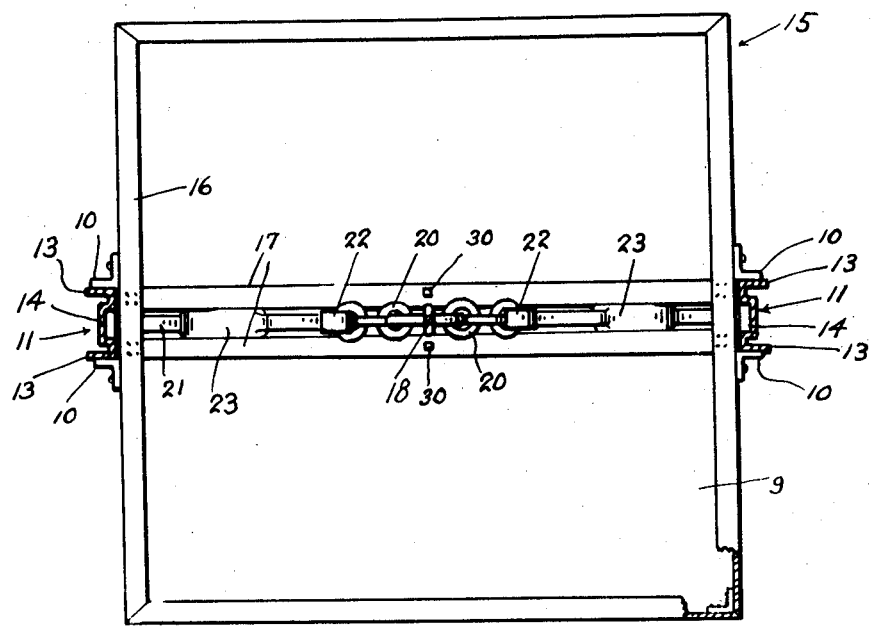
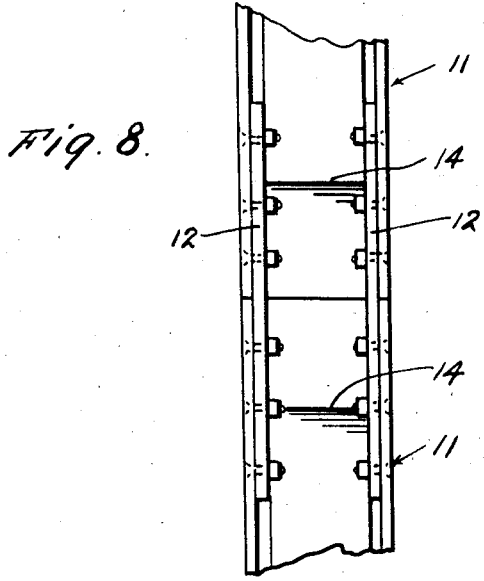
Inventor
Charles Maier
By Clarence A. O'Brien
Attorney Patented Aug. 29, 1933

1,924,506

UNITED STATES PATENT OFFICE 1,924,506

SAFETY MECHANISM FOR ELEVATORS

Charles Maier, Racine, Wis.

Application March 28, 1933. Serial No. 663,192

2 Claims. (Cl. 187—82)

This invention relates to a novel mechanical safety device for use in connection with elevator cages of the type raised and lowered by a central suspension cable or equivalent means.

Briefly stated, the preferred embodiment of the invention utilizes a double or duplex pivoted pawl arrangement and a toothed track rail with which the pawls are automatically engageable when an emergency arises, such as for example, when the suspension cable breaks, whereby to check gravitation or descent of the cage and to thereby overcome serious damage to life and property.

I am aware of the fact that the broad proposition just recited is not a new assembly in this particular line of endeavor. It follows that it is my aim to generally improve upon safety appliances and mechanism of this classification by providing certain noteworthy refinements and variations in selection and adaptation of parts in order to promote more satisfactory results and action.

In reducing the inventive conception to actual practice, I have evolved and produced a construction which is efficient in performance, positive and dependable in action, simple and economical, practicable from a manufacturing and commercial viewpoint and otherwise susceptible of fulfilling the requirements of a device of this class in a desirable manner.

Other features and advantages will become more readily apparent from the following description and drawings.

In the drawings:—

Figure 1 is a view in section and elevation illustrating the general assembly and disclosing the essential parts in proper particularity.

Figures 2 and 3 are sectional views taken approximately on the planes of the lines 2—2 and 3—3 respectively of Figure 1.

Figure 4 is a perspective view of the pawl actuation spring and attaching clip therefor.

Figure 5 is a fragmentary perspective view showing the coupling means for the special track rail.

Figure 6 is a top plan view of the structure illustrated in Figure 1.

Figure 7 is a perspective view of one of the pawls.

Figure 8 is a detail view showing the manner of connecting or coupling two rail sections together.

Figure 1:
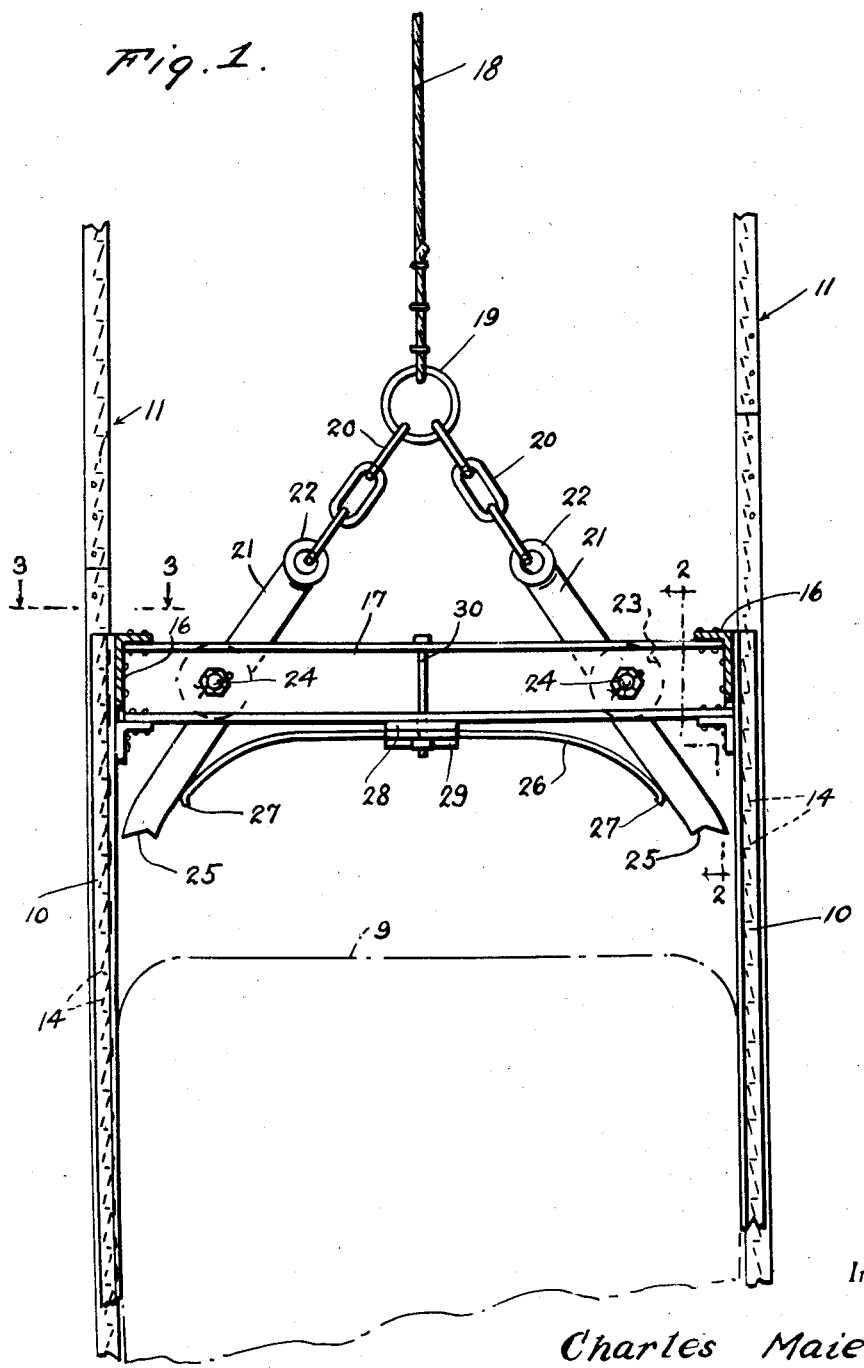

Referring now to the illustrated drawings wherein the preferred embodiment of the invention is disclosed by way of proper pictorial drawings, it will be observed that the elevator cage is indicated at 9 in Figure 1, this being of any appropriate construction. Attached to and rising from the cage are vertical spaced parallel angle irons 10 arranged in proper pairs to function as runners, these being slidably cooperable with the vertical track rails. The rails are made up of companion rail sections 11, the rail sections being of duplicate construction and are secured together by jointing or fish plates 12, as illustrated in Figure 8. Each rail section is of the construction shown in Figure 5, from which it will be observed that it is in the form of a metal stamping of appropriate proportion, the same embodying spaced parallel side flanges 13 and a connective web fashioned to provide appropriate pawl engaging teeth 14.

The numeral 15 in Figure 6 designates a suitable frame to which the runners 10 are bolted or otherwise fastened. This frame embodies a plurality of angle bars 16 riveted or otherwise fastened to a pair of central spaced parallel channel-shaped beams 17 to which the hoist and pawl mechanism is connected. The hoisting means comprises a conventional cable 18 which in accordance with the present invention and as shown in Figure 1, is attached to a ring 19 which is in turn secured by chains 20 to duplicate safety pawls 21. The upper ends of the pawls are formed with eyes 22 to which the chain links are connected. The central portion of each pawl is enlarged, as indicated at 23 and rockably mounted on a fulcrum bolt 24 carried by the beams 17. The lower or working end of the pawl is of V-shaped form, as indicated at 25 in Figure 7, this being the proper shape to conveniently engage the safety stop teeth 14. A semi-elliptic or correspondingly shaped leaf spring 26 is employed for actuating the two pawls outwardly under emergency conditions. It will be noted that the outer or free end portions of the spring are slightly inturned or curled, as indicated at 27, to provide the requisite cam-like pressure to ride the pawls outwardly into engaging position when conditions require. The spring is attached to the beams by a clip. The clip shown in Figure 4 comprises upper and lower plates 28 and 29 suitably fashioned to embrace the central portion of the spring, this clip being secured to the beams by way of maintenance bolts 30, as shown clearly in Figures 1 and 2. Thus it will be seen that the structural arrangement is characterized by the frame 15 having the spaced parallel centralized beams 17 and the perpendicular spaced parallel runners 10 attached to the frame and depending on opposite sides of the side flanges 13 of the track rails 11.

This provides the requisite support for the cage 9. The hoisting and lowering means comprises the cable 18 which in the present instance is attached to the beams 17 through the instrumentality of the safety double pawl arrangement. The pawls are pivotally mounted between their ends on the beams and have their lower ends arranged to engage the safety teeth 14 in case of breakage of the cable. If the cable breaks, the single strong spring 26 automatically comes into play to straighten itself and thereby forces the two pawls outwardly into engaging relationship with the teeth 14. I, therefore, believe that I have evolved and produced something which is unequaled in the art and trade and which is practical and modern and while not broadly new is a readily recognizable improvement and contribution to the trade and art to which it relates. It is characterized by rigidity and ruggedness and is otherwise well suited to perform satisfactorily in the desired capacity.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structural arrangement of the class described, a pair of opposed tooth equipped track rails, a frame embodying spaced parallel hoisting beams, pairs of perpendicular parallel guide runners attached to and depending from the frame and slidably engaged with the track rails, a pair of companion pawls pivotally mounted intermediate their ends adjacent the opposite end portions of said beams, the lower ends of said pawls being arranged to automatically engage the teeth of the rails under emergency conditions, a hoisting cable, a connection between the cable and upper ends of the pawls, and a single spring device supported from the beams and engageable with the lower end portions of the pawls to render the pawls active.

2. In a structure of the class described, a traveling frame embodying spaced parallel beams, a pair of duplicate pawls pivotally mounted intermediate their ends between said beams, chains connected to the upper ends of the pawls, a hoisting cable, means connecting the cable with the chains, toothed track rails, operating connections between the frame and track rails, the pawls being arranged for engagement with the teeth of the track rails, a single longitudinally bowed flat spring having its end portions formed into cam-like curls engaging the adjacent end portions of the respective pawls, a clip embracing the central portion of the spring, and bolts securing said clip to the intermediate portions of said beams.

CHARLES MAIER.